July 13, 1926.
E. B. HOUGH
DUMPING GEAR
Filed March 31, 1924   3 Sheets-Sheet 1
1,592,766
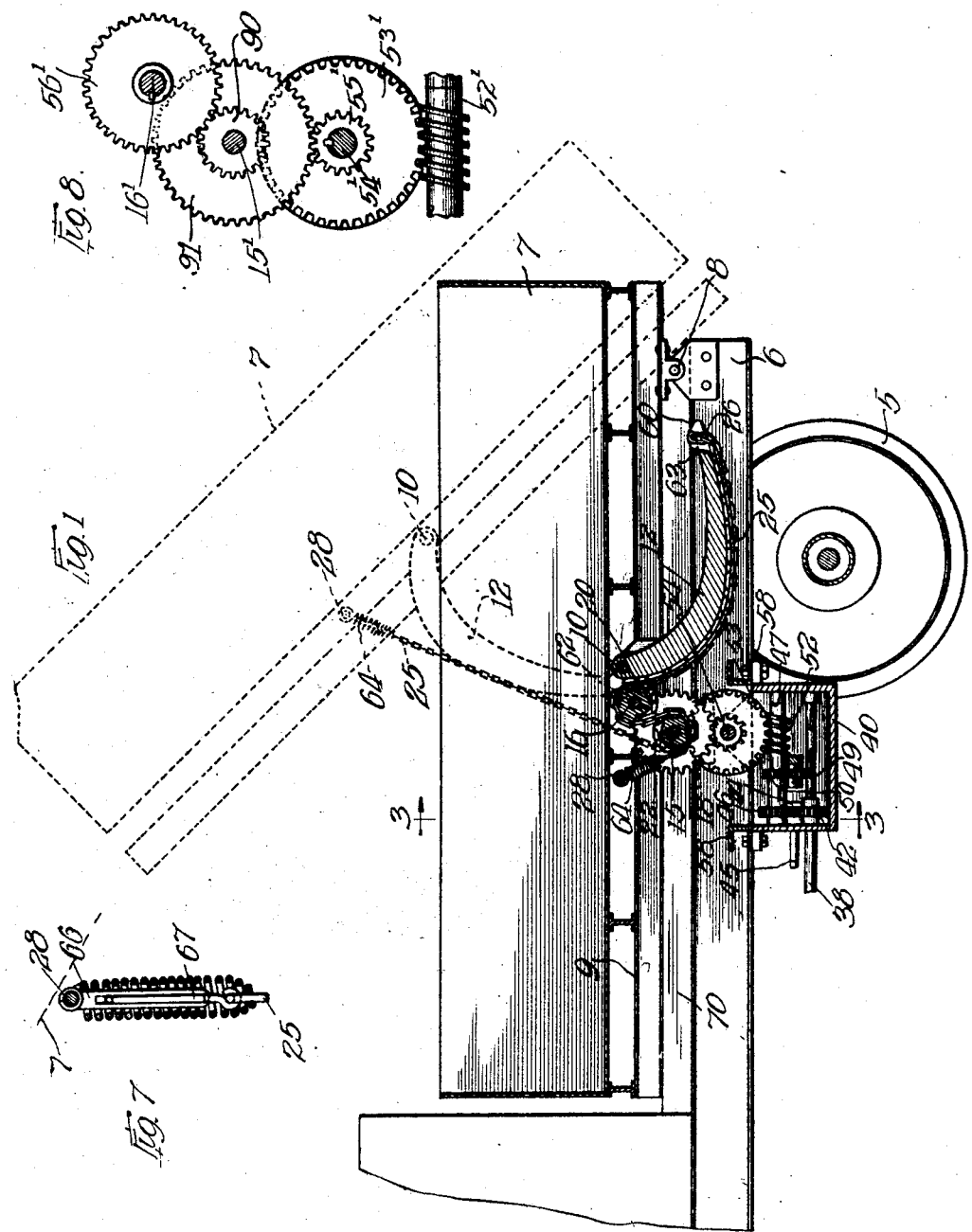

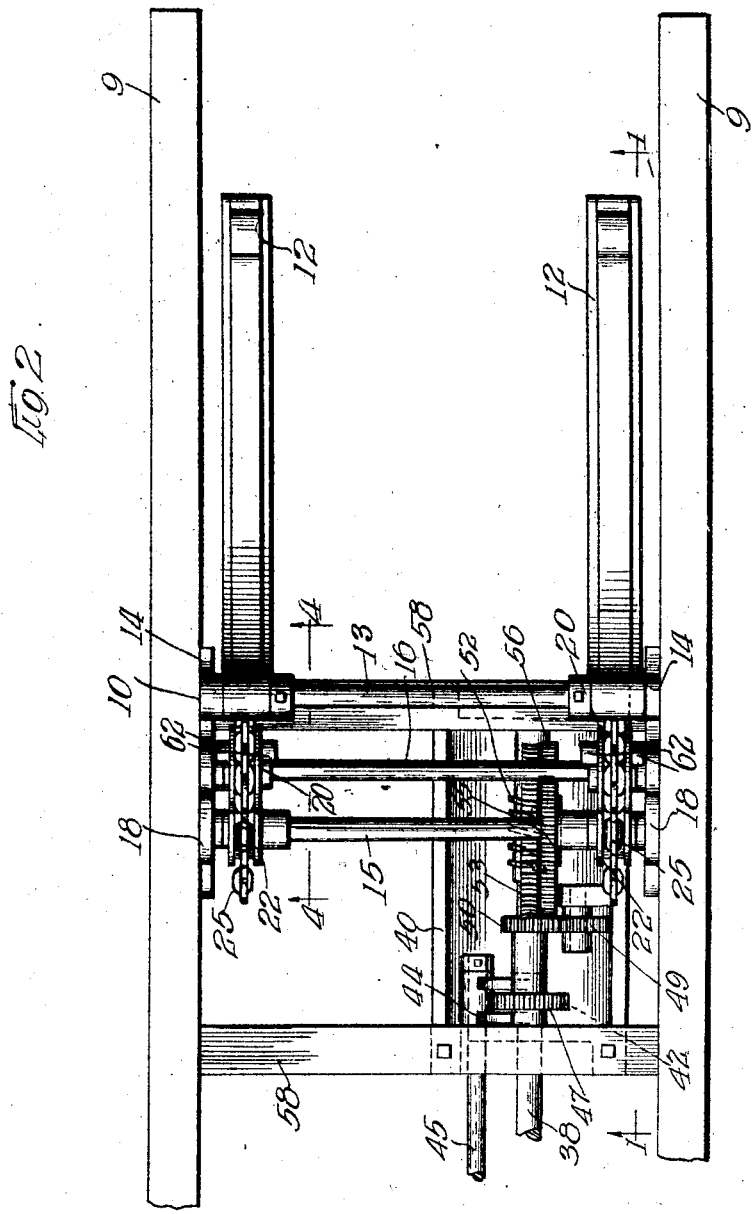

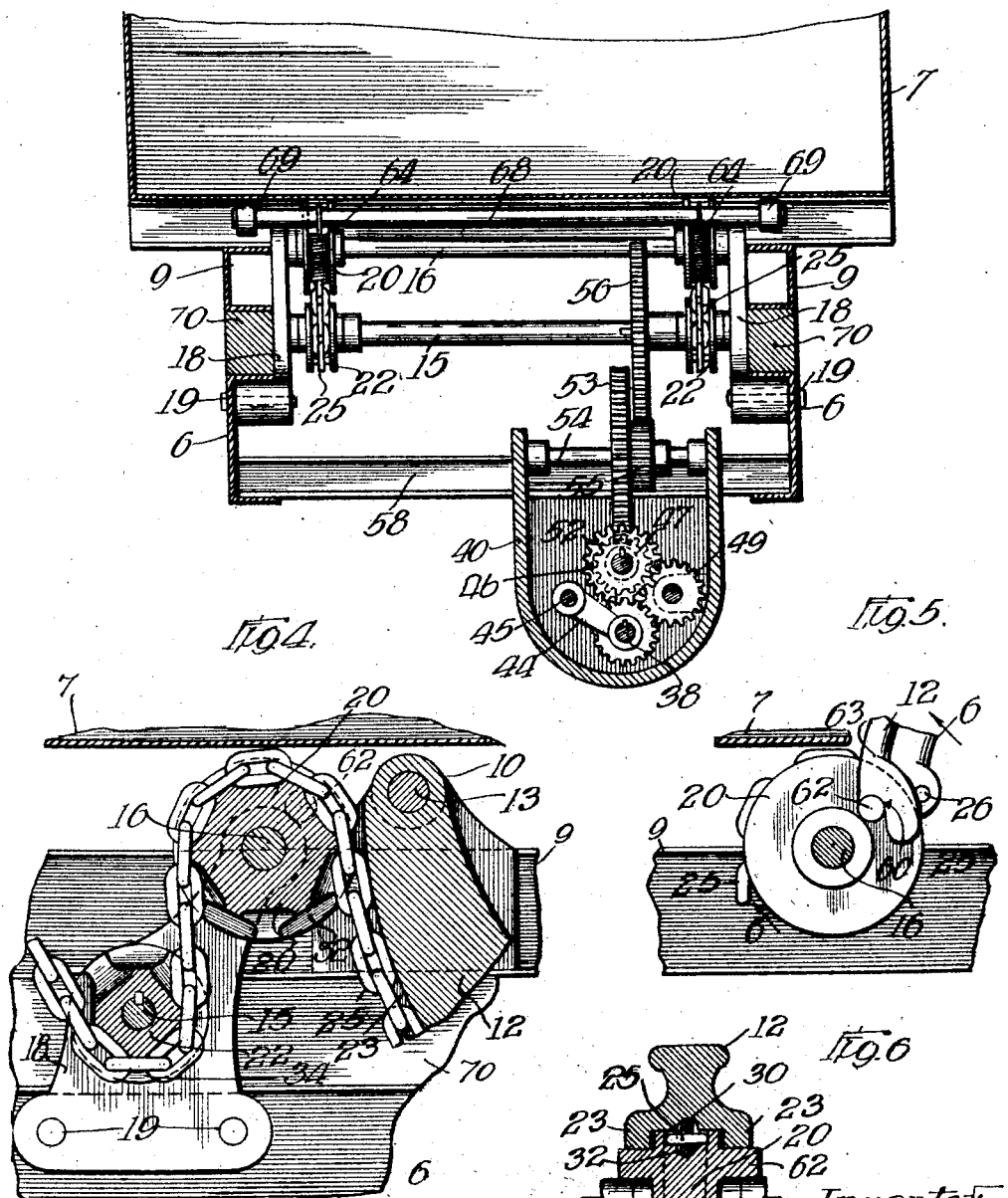

Patented July 13, 1926.

1,592,766

UNITED STATES PATENT OFFICE.

EARL B. HOUGH, OF CHICAGO, ILLINOIS, ASSIGNOR TO HOUGH MECHANICAL HOIST COMPANY, OF CHICAGO, ILLINOIS.

DUMPING GEAR.

Application filed March 31, 1924. Serial No. 703,028.

This invention relates to dumping gear and while particularly applicable for dumping the bodies of vehicles and the like, and for under body installation, the invention is not limited to a particular use or to a particular installation.

While the invention is particularly adapted for use in connection with power application means from the engine or motor of the vehicle, it is not limited to such means for actuation. It may be actuated by any suitable gear arrangement or hydraulically, manually or otherwise as desired.

The primary object of the invention is the provision of a generally improved and simplified construction, which is compact, comprises few parts, and which may be economically produced.

The device applies the lifting effort effectively and it does not appreciably diminish the road clearance nor interfere with mechanism under the body. It provides for locking the tilting body firmly in lowered position against vibration and rattling with the movement of the vehicle, also for locking the body in any other desired position and for securing a maximum dumping angle with a strut of minimum length and with a minimum movement thereof. The struts are held firmly on their guides, the flexible elements are maintained taut and any tendency of the body to throw over rearwardly as it is raised is prevented. The parts are all held firmly together through the various angular positions of the body.

In my prior construction the strut which raises the body lies tangent to the front side of the drum, while in the present construction the strut lies tangent to the rear side of the drum. This permits of a simpler and more advantageous arrangement such that the strut does not interfere with the chassis or other part of the mechanism.

To acquaint those skilled in the art with the manner of constructing and using the invention I will now describe in connection with the accompanying drawings a specific embodiment of the invention.

In the drawings:—

Figure 1 is a vertical section taken on line 1—1 of Fig. 2 showing the dumping gear in said elevation;

Fig. 2 is a top plan view with the sub-frame of the body in place and the body thereof removed;

Fig. 3 is a vertical section on line 3—3 of Fig. 1;

Fig. 4 is an enlarged vertical section on line 4—4 of Fig. 2;

Fig. 5 is a fragmentary detail elevation showing the cooperation between the free end of the strut and the lateral pin on the guide or sheave.

Fig. 6 is a detail section through the guide and strut;

Fig. 7 is a detail section showing one form of expansion limiting connection for the spring between the flexible element and the body; and Fig. 8 is a fragmentary detail section of a modification in which the power is applied to the guide roller or drum shaft.

The vehicle or truck which has the usual or any suitable running gear including the wheels 5 is provided with a frame which includes the sills or side frame members 6. This frame preferably though not necessarily comprises a part of the chassis of the vehicle. A separate frame may, however, be provided and this separate frame secured on the chassis. The various operating parts are secured to the frame as will be apparent.

The dumping body 7 is hinged or pivoted at 8 to the frame members 6, as well understood in the art. It preferably has a sub-frame 9 to which are pivotally connected at 10 struts or arms 12. These struts or arms 12 are preferably disposed near the sides of the frame and the pivoting at 10 preferably, in practice, comprises a single transverse shaft 13 journaled at its opposite ends in saddles 14 on sub-frame 9. Separate pivots may of course be employed, also the sub-frame 9 may be omitted and the pivoting of struts 12 to the body may be varied. Mounted upon the frame 6 of the vehicle are a pair of cross shafts 15 and 16, these shafts being journaled at their opposite ends in brackets 18 and if necessary provided with center or intermediate bearings. Brackets 18 are attached at 19 to the bases of frame sills 6 and project upwardly and are inclined rearwardly to journal shaft 16 above and behind shaft 15. A pair of combined sheaves and guides 20 are mounted upon the shaft 16 near brackets 18 so as to register with struts 12. Keyed on shaft 15 preferably in register with guides or sheaves 20 are a pair of power sprockets 22.

From the pivotal attachment to the body, struts 12 extend down and are curved rearwardly beneath the body to lie in substantially a horizontal plane when the body is in lowered position. This provides maximum road clearance and permits use of the dumping gear under practically any type of body without interference with the cross members, brake rods or other vehicle mechanism beneath the body. When the body is in lowered position struts 12 extend substantially horizontally between and in the plane of sills 6. In none of the tilted positions of the body do said struts project appreciably below sills 6 so that the road clearance is not decreased by the dumping gear and interference with mechanism under the body is avoided. When the body is in lowered position the concave upper edges of struts 12 face upwardly and rearwardly and it should be noted that the pivots 10 are positioned at the forward ends of struts 12 when the body is in lowered position.

The under convex edges of arms 12 ride tangentially on guides 20 and are guided over the guides or sheaves 20 by flanges 23. The flanges 23 are preferably formed integral with the edges of the struts 12 and are spaced apart a suitable distance to embrace the edges of the guide sheave. A suitable flexible element, such as the chain 25 is fastened at one end 26 to the free end of each strut 12. Chains 25 are trained along the convex under edges of struts 12, up between the struts and rollers 20, down around power sprockets 22, and up to and are connected at their opposite ends at 28 to the body 7. Struts 12 have grooves 30 so that the chain will not be subjected to the crushing effect between the struts and drums and the rollers or drums 20 have pockets 32 spaced circumferentially thereabout for cooperation with the chain 25 as well understood in the art. The power or driving sprockets 22 have similar pockets 34 for driving engagement with the chain 25. The formation of the sprocket teeth or pockets which mesh with the links of the chain 25 are well known in the art.

While the power means for applying the lifting effort to struts 12 through flexible elements 25 may be varied that shown includes a power transmission shaft 38 extending longitudinally of the chassis frame. Shaft 38 is connected to be driven from the engine or motor of the vehicle, for example, and the rear end of said shaft 38 extends into a gear case 40 and carries a driving pinion or gear 42 keyed thereon for rotation as a unit therewith. Gear 42 is adapted to be shifted along the shaft 38 by a shifting arm 44 and shifting rod 45, for example, into mesh with a gear 46 keyed on a worm shaft 47 journaled in casing 40 or out of mesh with gear 46 and into mesh with an idler gear 49 which meshes with a gear 50 on the worm shaft to reverse the direction of rotation of said shaft. Fixed on the worm shaft 47 is a worm 52 which meshes with a worm wheel 53 mounted on a cross shaft 54 with a pinion 55 which is connected to the worm wheel to rotate in unison therewith. Pinion 55 meshes with a relatively large spur gear 56 keyed on the cross shaft 15 to turn said cross shaft and the driving or power sheaves 22 thereon. The gear case 40 is shown suspended from cross frame member 58 carried by the chassis of the vehicle.

The load lifting struts 12 are provided at their free ends with sockets 60 which sockets are adapted to engage near the end of the lifting stroke or movement, pins or lateral extensions 62 carried by and projecting laterally from guide sheaves 20. Engagement of socket 60 with pin 62 imparts a toggle or a knuckle or leverage action at the end of the lifting stroke, the strut end of the chain 25 being secured at 26 upon a pin adjacent the concave edge of the strut and extending out through a recess 63 in the strut. The attachment at 28 of the chain 25 to the body 7 is preferably through a spring or other yieldable connection 64 the driving sprocket 22 engaging in a bight in chain 25 between the attachment at 28 to the body and at 26 to the strut. The spring 64 preferably has an expansion limiting element such as a pair of links 66 and 67 having a lost motion connection as shown in Fig. 7 so that a limited expansion of the spring is permitted and thereafter a rigid mechanical connection is effected for preventing undue expansion of the spring. The particular details of this expansion limiting connection may, of course, be varied. In practice the attachment at 28 is preferably through a cross shaft 68 carried by and journaled at its opposite ends at 69—69 on the body 7.

For the purpose of terminating the power application as the end of the stroke is reached automatic throw-out means such as that shown in my co-pending application, Serial No. 460,417, filed April 11, 1921, is preferably provided for automatically disconnecting the power application to the lifting strut as the body reaches the end of its dumping angle. In that case the change gear is automatically thrown into neutral position as the end of the stroke is reached. A clutch or other suitable automatic throw-out may be provided. The worm 52 and worm wheel 53 provide a self-locking driving connection in the power transmitting connection to the lifting strut, which positively holds the body in raised or dumping position or in any of its other tilted positions and thereby makes the body easily controlled.

The operation is as follows:

Normally when the body 7 is lying flat on the longitudinal supporting members 70 on the frame, the struts or arms 12 lie in substantially a horizontal plane with their forward ends turned up tangentially with respect to drums or rollers 20. As power is applied to the shaft 15 to rotate sprockets 22 in a clockwise direction, the chains 25 are driven over the sheaves and sprockets from their strut to their body ends. The motion of the chains is imparted to the struts and said struts are rolled over the guides 20 with a resulting upward movement and then rearward swinging of the forward upturned ends of said struts. This provides an effective application of the lifting effort and the rearward disposition of the struts with respect to the body provides for securing a maximum dumping angle with struts of minimum lengths and with a minimum movement of said struts. This makes for compactness and permits maximum dumping angles on trucks having relatively short wheel bases. The struts or arms 12 always tend to roll tangentially on the peripheries of guides 20 until the sockets 60 engage over the pins 62 whereupon a knuckle, leverage or toggle action occurs through guide sheave 20 with their pins 62 and struts 12 to the body 7. The power application is terminated by the automatic throw-out and the worm and worm wheel is self-locking to hold the body in raised or any other desired position.

To lower the body, gear 42 is shifted to cause it to mesh with idler 49 whereupon the shaft 15 is reversed in its rotation with the result that the power sprockets 22 are rotated to drive the chains 25 from their body ends to their strut ends, to bring the struts down and lower the body to normal horizontal position.

After the body 7 is lowered to its normal horizontal position on the vehicle frame the power application may be continued to expand and thereby tension spring 64. Then upon terminating the power application the self-locking engagement between worm 52 and worm wheel 53 will lock the springs 64 in expanded or tensioned condition and the tensioned springs 64 will hold the body 7 firmly in place in lowered position upon the frame and against appreciable vibration, rattling and relative movement. Springs 64 also allow sufficient give in flexible element 25 to prevent rupturing or breaking of said element where the body approaches the limit of its tilting movement quickly and with a shock, and they take up any slack in elements 25 and maintain said elements in proper cooperation with the power sheaves and taut between their attachment at one end to the struts and at their opposite ends to the body. The struts are held firmly on their guides, the flexible elements are maintained taut and any tendency of the body to throw over rearwardly as it is raised is prevented. The parts are all held firmly together throughout the various angular positions of the body. The connection of the flexible element 25 between the strut and body with the power sprocket engaging in a bight between the ends of the flexible element and the yieldable connection at 64 obviously also permits a limited tilting of the body 7 free of the power application means.

In Fig. 8, I have shown the shaft 16' as the power shaft. The power is applied to said shaft 16' through the meshing engagement of a relatively large spur gear 56' keyed directly on said shaft 16' with an idler gear 90 which is shown loosely mounted upon shaft 15', and secured to turn a gear 91 on the same shaft therewith. Gear 91 in turn meshes with the driving pinion 55' which corresponds to pinion 55 of the previous embodiment. Shafts 15', 16' and 54' correspond to shafts 15, 16 and 54 of said previous embodiment. In this case the sheaves 22 may serve as idlers and the chains 25 may be trained about them and extended up to and attached to the body as before. But few reduction gears are employed and the drive is exceedingly simple and powerful.

While the lifting chains 25 with their idler and power sheaves have great strength and are especially suitable for the purposes of this invention, it is to be understood that any other suitable flexible elements may be employed and that the driving cooperation therewith may be varied accordingly. Other modifications and changes are contemplated within the scope of the appended claims.

I claim:—

1. In combination, a frame, a body pivoted thereto, a sheave member, a driving member, a strut secured to the body and guided tangentially on one of said members, and a flexible element connected between the strut and body and trained over said sheave and driving members.

2. In combination, a frame, a body pivoted thereto, a strut pivoted to the body, a guide for said strut, a flexible element attached to the strut, and having yieldable connection with the body, power application means drivingly engaging said element and adapted for lifting the body, said yieldable connection being adapted to be tensioned by said power means upon lowering the body, and means for locking said element in tensioned condition to hold the body in place.

3. In combination, a frame, a body pivoted thereto, a guide, a lifting strut pivoted to the body and lying tangent to the guide, a flexible element connected between the strut and body, and means drivingly engaging in a bight in said element for lifting the body therethrough, said means including a self-locking driving connection.

4. In combination, a frame, a body pivoted thereto, a drum, a strut curved tangent to the rear of the drum and pivoted to the body, with its concavity facing up and rearwardly, a flexible element attached to the strut and trained along the convex side of the strut and around the drum, a yieldable connection between said element and the body, and power application means having driving engagement with said element for lifting the body therethrough.

5. In combination, a frame, a body pivoted thereto, a guide, a strut pivoted to the body and operable tangentially on the guide, a flexible element attached to the strut and anchored to the body and operating means for the strut having driving engagement with said flexible element between its attachment to the strut and its anchorage on the body.

In witness whereof, I hereunto subscribe my name this 24th day of March, 1924.

EARL B. HOUGH.